United States Patent
Huang

(10) Patent No.: US 8,985,790 B2
(45) Date of Patent: Mar. 24, 2015

(54) MOUNTING STRUCTURE FOR THE VEHICLE AUXILIARY MIRROR

(71) Applicant: Yu-Feng Huang, Tainan (TW)

(72) Inventor: Yu-Feng Huang, Tainan (TW)

( * ) Notice: Subject to any disclaimer, the term of this patent is extended or adjusted under 35 U.S.C. 154(b) by 252 days.

(21) Appl. No.: 13/694,333

(22) Filed: Nov. 21, 2012

(65) Prior Publication Data

US 2013/0120866 A1    May 16, 2013

(51) Int. Cl.
*G02B 7/182* (2006.01)
*B60R 1/08* (2006.01)
*B60R 1/078* (2006.01)

(52) U.S. Cl.
CPC .................. *B60R 1/081* (2013.01); *B60R 1/078* (2013.01)
USPC ........................................................ 359/871

(58) Field of Classification Search
CPC .............. B60R 1/02; B60R 1/04; B60R 1/06; B60R 1/07; B60R 1/078; B60R 1/08; B60R 1/081; B60R 1/082; B60R 1/12
USPC ........................... 359/865, 864, 868, 872, 879
See application file for complete search history.

(56) References Cited

U.S. PATENT DOCUMENTS 6,988,810 B2 * 1/2006 Chen ............................ 359/871

* cited by examiner

*Primary Examiner* — Euncha Cherry

(57) ABSTRACT

The present invention provides a mounting structure for the vehicle auxiliary mirror, including an attachment plate enabling said auxiliary mirror to be attached to the rear-view mirror, at least one first hook configured on the edge of said attachment plate corresponding to the mirror frame opening of the rear-view mirror and allowed to hook the abutting mirror frame opening of the rear-view mirror, a fixing belt with one end fastened to the housing of said auxiliary mirror disposed on the middle of the rear face of said auxiliary mirror and adjustable in length, and a second hook secured to the other end of said fixing belt and allowed to hook the rim of the rear-view mirror frame opening opposite to the rim hooked by the first hook via the rear face of the rear-view mirror, so that said auxiliary mirror may be tightly attached to the rear-view mirror.

8 Claims, 5 Drawing Sheets

The present invention relates to a mounting structure for the vehicle auxiliary mirror, and more specifically, to a mounting structure that allows the auxiliary mirror to be tightly attached to the rear-view mirror as an integral whole. Further, the auxiliary mirror disclosed in the present invention may engage with a different type of rear-view mirror only by making a replacement with the type of attachment plate corresponding to the shape of the attached surface of the rear-view mirror and thereby reinforce the joining tightness between the auxiliary mirror and the rear-view mirror. In addition, the product cost may be lowered because only those types of attachment plates which correspond to different shapes of the attached surfaces of the rear-view mirrors need making new moulds so as to save the cost.

2. Description of the Prior Art

In order to reduce the blind spots as well as to enhance the visual field for safe driving, some drivers would have their vehicles mounted with an auxiliary mirror on the outer side of the rear-view mirror. Said auxiliary mirror is coupled with the rear-view mirror by a mounting device so as to enable said auxiliary mirror to be fixed on the outer side of the rear-view mirror. The published cases, such as USD544820, USD545256, U.S. Pat. No. 5,724,199, U.S. Pat. No. 7,059,734, U.S. Pat. No. 7,6284,981, TW 514041, TW 1256357, TW 1256358, TW M292513, TW M354748 etc., all disclosed a mounting device for fixing the auxiliary mirror to the rear-view mirror. According to the aforementioned prior art, the mounting device allows the auxiliary mirror to be secured to the rear-view mirror by means of upper as well as lower supports and a fixing belt. The mounting device with a bulky structure, discordantly configured between the two mirrors, not only lacks the joining tightness for being attached to by the two mirrors but also looks unbeautiful. It is against this background and the deficiencies associated therewith that the present invention has been developed.

SUMMARY OF THE INVENTION

It is a primary object of the present invention to provide a mounting structure for the vehicle auxiliary mirror which allows the vehicle auxiliary mirror to be tightly attached to a rear-view mirror so as to enable both to be unified into an integral whole.

It is another object of the present invention that the mounting structure for the vehicle auxiliary mirror is also provided with an attachment plate which allows the vehicle auxiliary mirror to be attached to the rear-view mirror and which may be mounted to a different type of rear-view mirror by means of making a replacement with the type of attachment plate corresponding to the shape of the attached surface of the rear-view mirror so as to enable the vehicle auxiliary mirror to be tightly secured to different types of rear-view mirrors, and thus it does not require making a new mould for the whole set of the auxiliary mirror corresponding with a different type of rear-view mirror, so that the cost spent on mould making and producing may be lowered.

According to the main feature of the present invention, the mounting structure for the vehicle auxiliary mirror includes an attachment plate enabling said auxiliary mirror to be attached to the rear-view mirror, at least one first hook configured on the edge of said attachment plate corresponding to the mirror frame opening of the rear-view mirror and allowed to hook the abutting mirror frame opening of the rear-view mirror, a fixing belt with one end fastened to the housing of said auxiliary mirror disposed on the middle of the rear face of said auxiliary mirror and adjustable in length, and a second hook secured to the other end of said fixing belt and allowed to hook the rim of the mirror frame opening of the rear-view mirror opposite to the rim hooked by the first hook via the rear face of the rear-view mirror, so that said auxiliary mirror may be tightly attached to the rear-view mirror as an integral whole. In addition, the auxiliary mirror may be mounted to a different type of rear-view mirror by means of making a replacement with the type of attachment plate matching the shape of the attached surface of the rear-view mirror, so that it does not require making a new mould for the whole set of the auxiliary mirror.

DETAILED DESCRIPTION OF EMBODIMENTS OF THE INVENTION

The means for achieving the aforesaid objective and the functions of the present invention will become apparent from the following description, taken in connection with the accompanying drawings, wherein a preferred embodiment of the present invention is disclosed.

Figure 1:
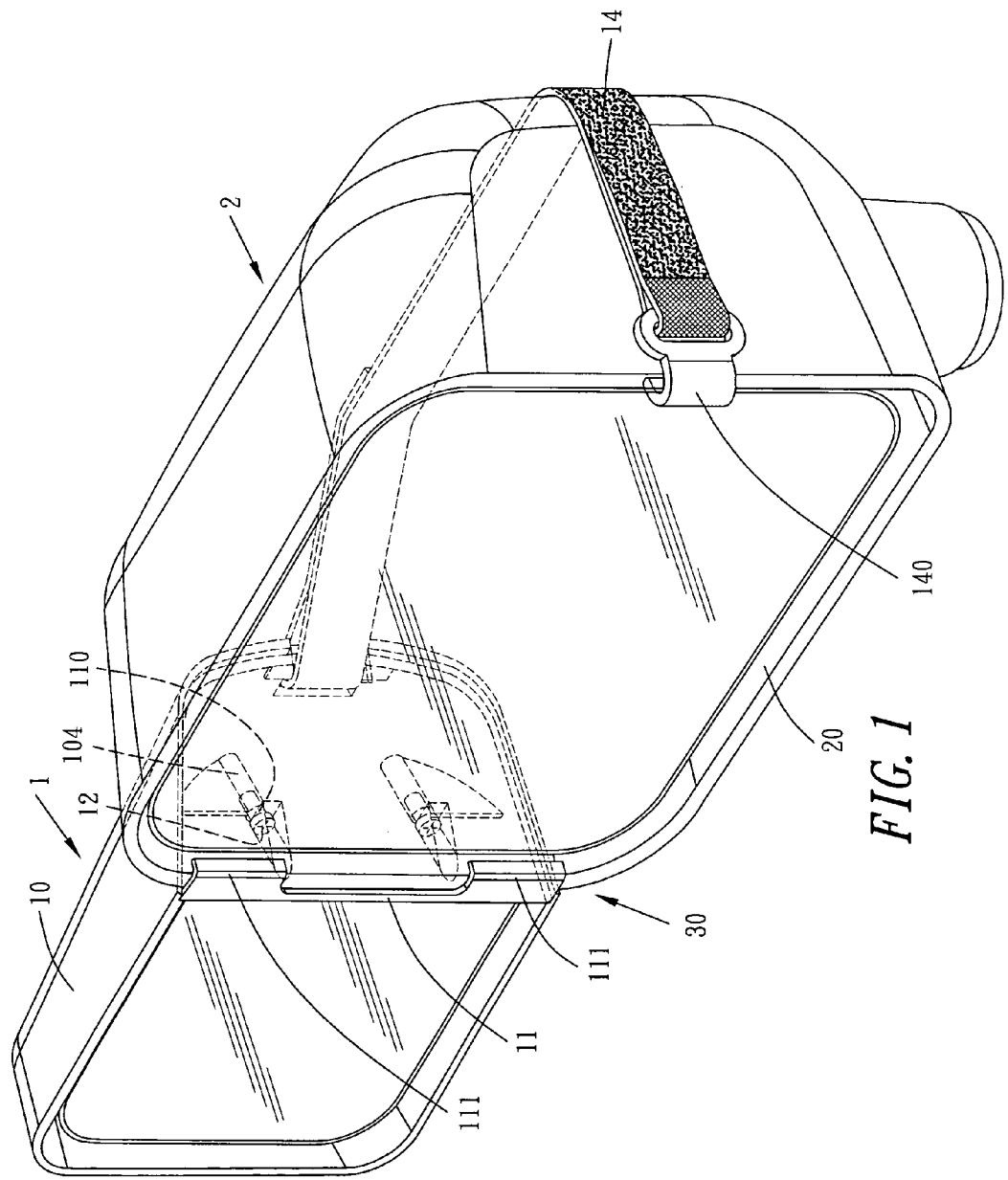
FIG. 1 is a diagram of a first embodiment of the present invention in a complete assembled mode.
Figure 2:
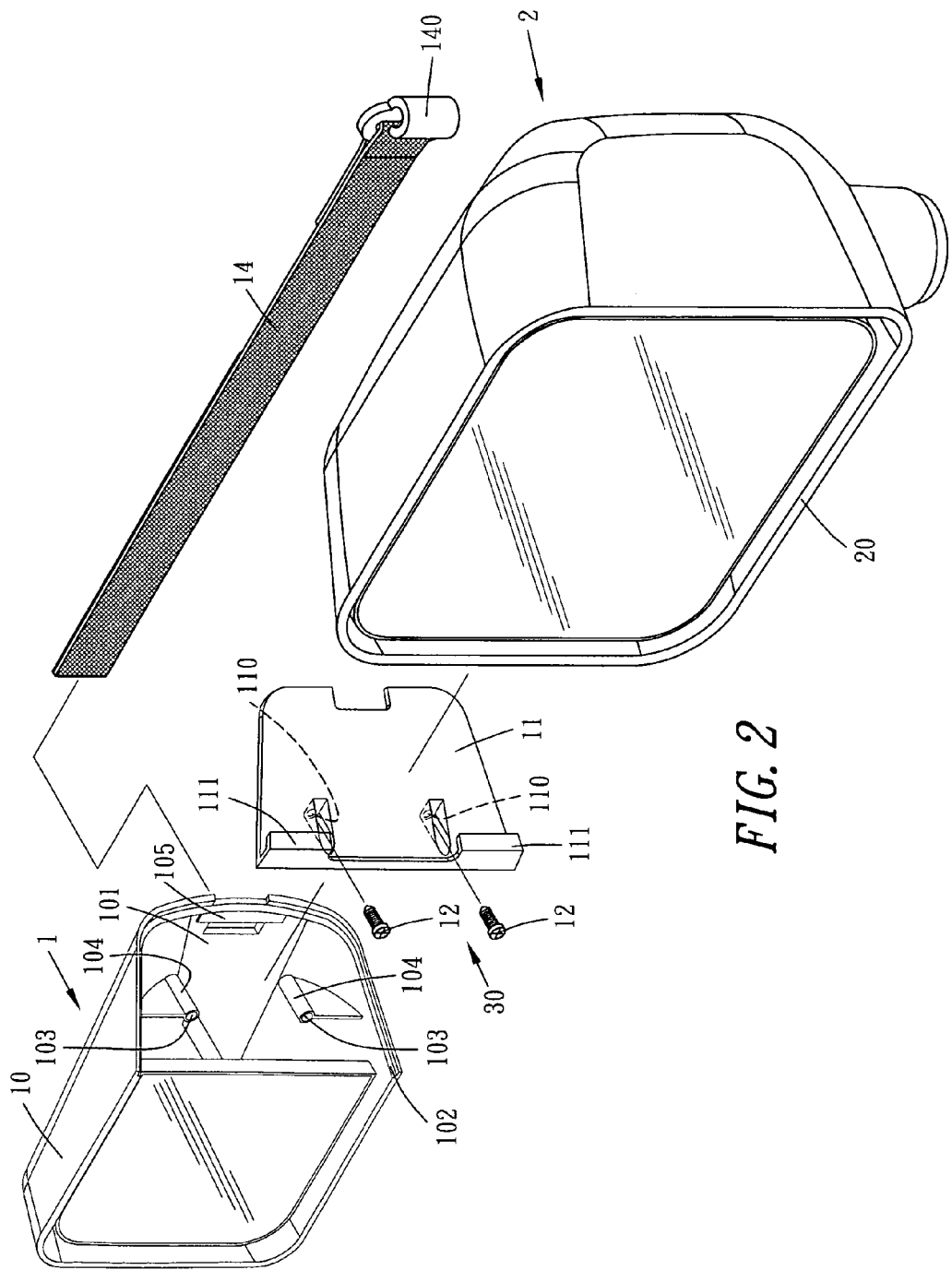
FIG. 2 is a breakdown diagram of a first embodiment of the present invention.
Figure 3:
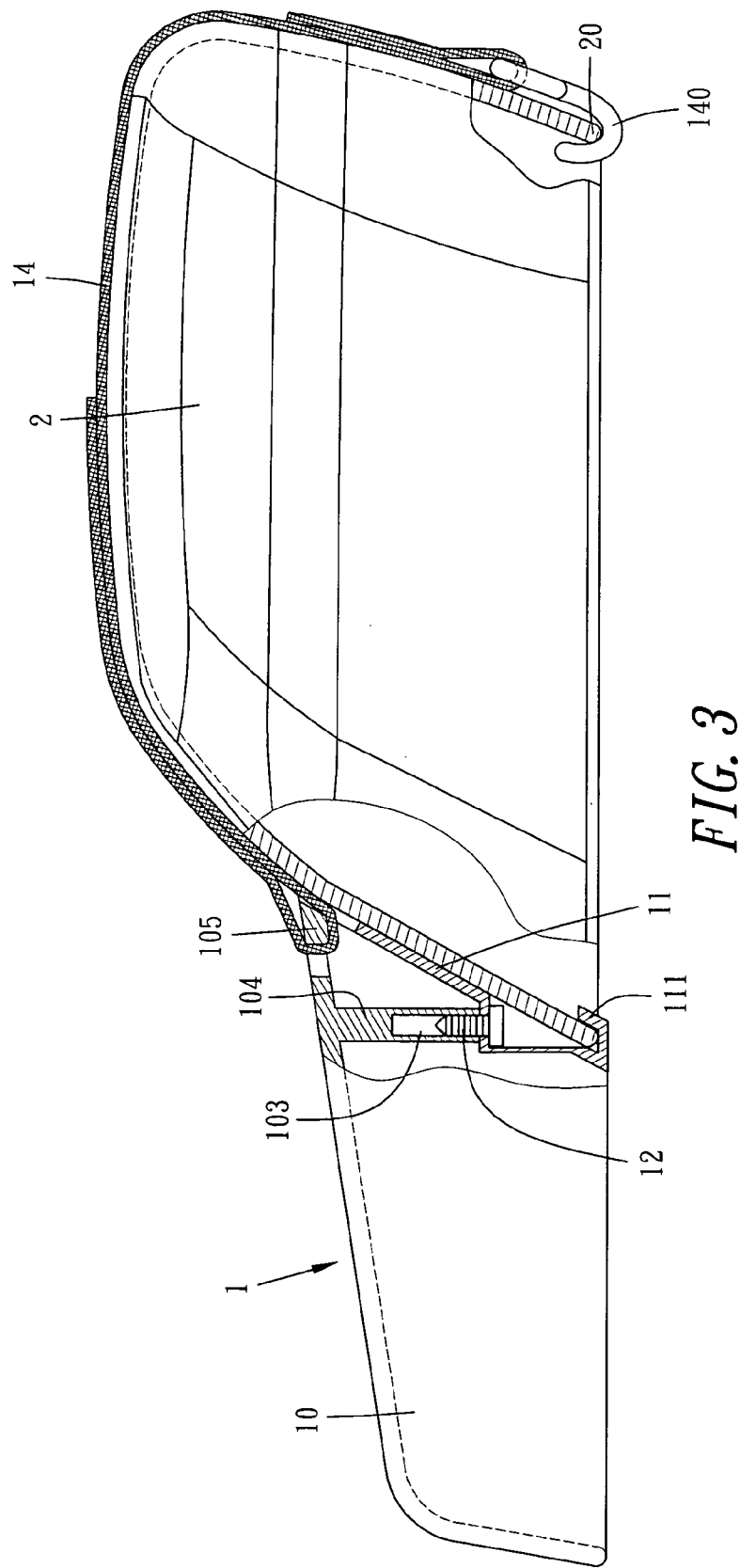
FIG. 3 is a cross-sectional view of a first embodiment of the present invention in a complete assembled mode.

Referring to FIG. 1 to 3, the auxiliary mirror 1 disclosed in the present invention is mounted on the transverse outer side of a vehicle rear-view mirror 2. The housing 10 of said auxiliary mirror 1 is coupled with the attachment plate 11 fastened to the rear-view mirror 2. Said joining device 30 is provided with a joining opening 101 located on the joining end where the mirror housing 10 and the attachment plate 11 are attached to each other, and the inner wall of said joining opening 101 is arranged with a holding lip 102 which is allowed to hold the outer edge of said attachment plate 11 when the attachment plate 11 is inserted onto the joining opening 101. Said attachment plate 11 is disposed with a perforation 110 that may be perforated through, and the interior of said mirror housing 10 corresponding to the perforation 110 location is configured with a hollow cylinder 104 having a cavity 103 within, so that a screw 12 may go through the perforation 110 via the outer side of the attachment plate 11 to be fastened to the cavity 103 of the hollow cylinder 104 so as to attach the attachment plate 11 to the joining opening 101 of the mirror housing 10.

The edge of said attachment plate 11 corresponding to the mirror frame opening 20 of the rear-view mirror 2 is arranged with at least one first hook 111 (two-hook configuration is preferable) on the side facing the mirror frame opening 20, and said hook 111 is allowed to hook the abutting mirror frame opening 20 of the rear-view mirror 2. The rear face of the housing 10 is configured with a fixing pin 105 in the middle thereof, and said fixing pin 105 allows one end of the fixing belt 14 to be anchored. Said fixing belt 14 is adjustable in length, and the other end thereof is provided with a second hook 140 which may hook the rim of the mirror frame opening 20 of the rear-view mirror 2 opposite to the rim hooked by the hook 111 via the rear face of the rear-view mirror 2.

When being assembled, said attachment plate 11 is inserted onto the joining opening 101 arranged on the housing 10 of said auxiliary mirror 1, and the edge of said attachment plate 11 is held by the holding lip 102 so as to cover the joining opening 101. The screw 12 may go through the perforation 110 of the attachment plate 11 to be fastened to the cavity 103 of the hollow cylinder 104 so as to enable the joining device 30 to attach the attachment plate 11 to the joining opening 101 on the mirror housing 10 of the auxiliary mirror 1. Said auxiliary mirror 1 is disposed on the transverse outer side of the rear-view mirror 2 by attaching the attachment plate 11 of said auxiliary mirror 1 to the mirror frame of the rear-view mirror 2. The first hook 111 of said attachment plate 11 may hook the rim of the abutting mirror frame opening 20 of the rear-view mirror 2, and by the second hook 140 and via the rear face of the rear-view mirror 2, the adjusted and fastened fixing belt 14 is fastened to the rim of the mirror frame opening 20 of the rear-view mirror 2 opposite to the rim hooked by the hook 111. According to the aforementioned, the auxiliary mirror 1 which is tightly attached to the outer side of the rear-view mirror 2 appears to be formed together with the rear-view mirror 2 as an integral whole (as shown in FIGS. 1 and 3).

Figure 4:
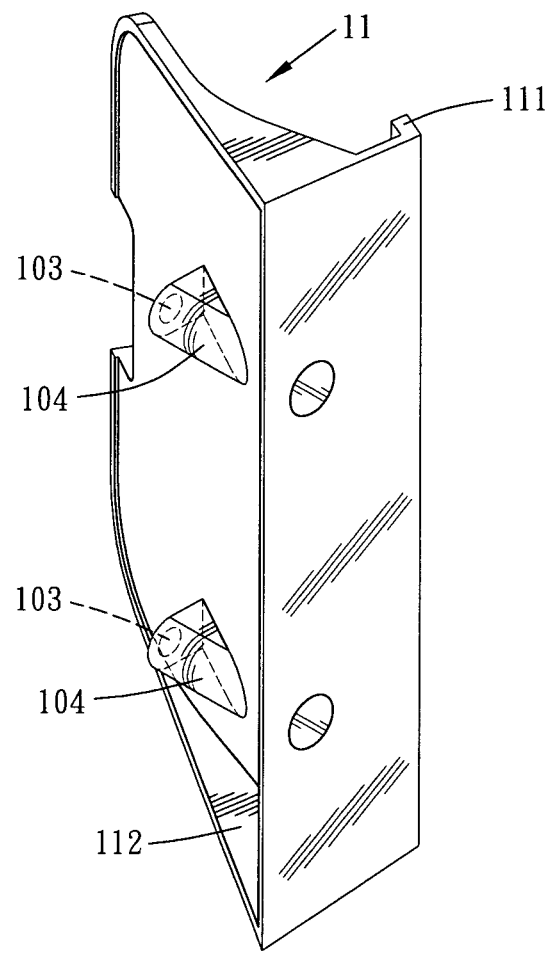
FIG. 4 is a stereogram of the attachment plate, in accordance with a second embodiment of the present invention.
Figure 5:
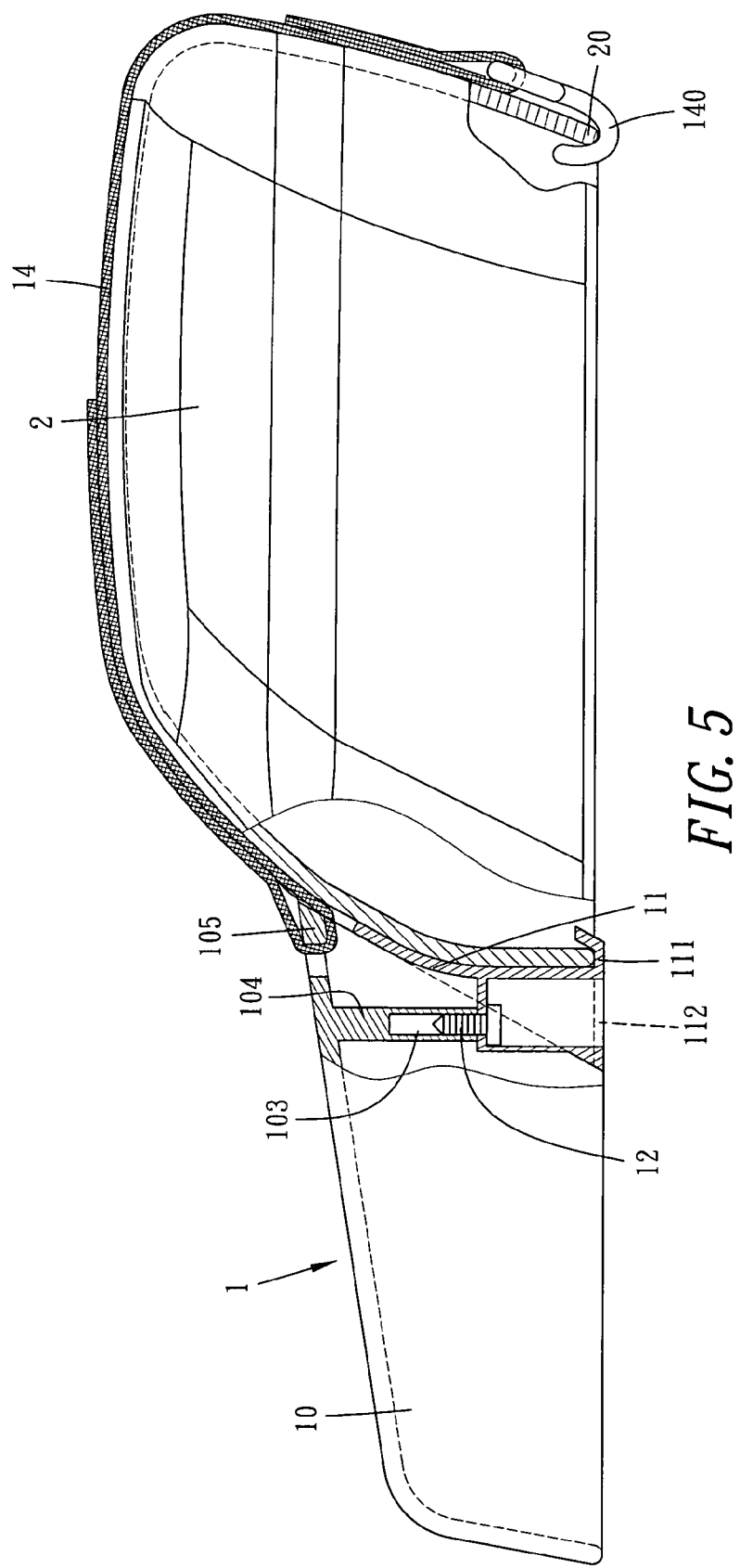
FIG. 5 is a cross-sectional view of a second embodiment of the present invention in a complete assembled mode.

When the auxiliary mirror 1 is to be mounted to the outer side of another type of rear-view mirror 2, the attachment plate 11 has to be replaced by the type of attachment plate 11 corresponding with the shape of the attached surface of the rear-view mirror 2 in order to engage with the rear-view mirror 2 (as shown in FIG. 4). Further, if the outer edge of said replaced attachment plate 11 does not engage with the holding lip 102 on the joining opening 101 of the auxiliary mirror 1, the outer edge of said attachment plate 11 may be arranged with an extended projecting edge 112 extending towards the joining opening 101 of the auxiliary mirror 1 when the attachment plate 11 is to be formed, so that the projecting edge 112 may be bound to the holding lip 102 of the auxiliary mirror 1 to eliminate the interspace which is between the attachment plate 11 and the holding lip 102 of the auxiliary mirror 1 and which results from changing the shape of the attachment plate 11 so as to enable the auxiliary mirror 1 to be tightly attached to the outer side of the rear-view mirror 2 as an integral whole (as shown in FIG. 5).

According to the mentioned above, it is very convenient for the users because the auxiliary mirror 1 disclosed in the present invention may be mounted to a different type of rear-view mirror 2 only by making a replacement with the type of attachment plate 11 corresponding to the shape of the attached surface of the rear-view mirror 2. In addition, the cost spent on mould making and producing may be lowered because the body and the frame of the auxiliary mirror 1 is not changed and thus it does not require making a new mould for the whole set of the auxiliary mirror 1 which costs more, that is, only those types of attachment plates 11 corresponding to different shapes of the attached surfaces of the rear-view mirrors 2 which cost less need making new moulds so as to save the product costs.

What is claimed is:

1. A mounting structure for the vehicle auxiliary mirror, comprising:
    an attachment plate which is one side wall of the housing of an auxiliary mirror for attaching to one side wall of the vehicle rear-view mirror;
    at least one first hook which is configured on the edge of said attachment plate facing the mirror frame opening of said vehicle rear-view mirror and which is allowed to hook the abutting mirror frame opening of said vehicle rear-view mirror;
    a fixing belt which is disposed on the rear face of said auxiliary mirror, has one end fastened to the housing of said auxiliary mirror and is adjustable in length; and
    a second hook which is secured to the other end of said fixing belt and hook the rim of the mirror frame opening of said rear-view mirror opposite to the rim hooked by said first hook via the rear face of said rear-view mirror.

2. The mounting structure for the vehicle auxiliary mirror as claimed in claim 1, wherein said attachment plate is coupled with the housing of said auxiliary mirror by a joining device.

3. The mounting structure for the vehicle auxiliary mirror as claimed in claim 2, wherein said joining device includes a joining opening located on the joining end where the housing of the vehicle auxiliary mirror and the attachment plate are attached to each other; a holding lip arranged on the inner wall of said joining opening so as to hold the outer edge of said attachment plate when the attachment plate is inserted onto the joining opening; at least one perforation on the attachment plate; and at least one hollow cylinder having a cavity within which is configured on the interior of the housing of said auxiliary mirror corresponding to said perforation location, and which enables a screw to go through the perforation via the outer side of the attachment plate to be fastened to the cavity of the hollow cylinder so as to attach the attachment plate to the joining opening of the housing of said auxiliary mirror.

4. The mounting structure for the vehicle auxiliary mirror as claimed in claim 2, wherein the shape of said attachment plate varies with the shape of the attached side wall of the rear-view mirror; and further, if the outer edge of said attachment plate does not engage with the holding lip of the housing of the auxiliary mirror, the outer edge of said attachment plate may be arranged with an extended projecting edge extending towards the housing of the auxiliary mirror so as to eliminate the interspace between the attachment plate and the housing of the auxiliary mirror resulting from changing the shape of the attachment plate.

5. The mounting structure for the vehicle auxiliary mirror as claimed in claim 3, wherein the shape of said attachment plate varies with the shape of the attached side wall of the rear-view mirror; and further, if the outer edge of said attachment plate does not engage with the holding lip of the housing of the auxiliary mirror, the outer edge of said attachment plate may be arranged with an extended projecting edge extending towards the housing of the auxiliary mirror so as to eliminate the interspace between the attachment plate and the housing of the auxiliary mirror resulting from changing the shape of the attachment plate.

6. The mounting structure for the vehicle auxiliary mirror as claimed in claim 1, wherein said attachment plate may be configured with two first hooks.

7. The mounting structure for the vehicle auxiliary mirror as claimed in claim 2, wherein said attachment plate may be configured with two first hooks.

8. The mounting structure for the vehicle auxiliary mirror as claimed in claim 3, wherein said attachment plate may be configured with two first hooks.

* * * * *